US009548896B2

(12) United States Patent
Naiksatam et al.

(10) Patent No.: US 9,548,896 B2
(45) Date of Patent: Jan. 17, 2017

(54) SYSTEMS AND METHODS FOR PERFORMING NETWORK SERVICE INSERTION

(71) Applicant: Big Switch Networks, Inc., Mountain View, CA (US)

(72) Inventors: Sumit Arun Naiksatam, Sunnyvale, CA (US); Kanzhe Jiang, Los Altos Hills, CA (US); Gregor Mathias Maier, Alameda, CA (US); Srinivasan Ramasubramanian, Redwood City, CA (US); Sudeep Dilip Modi, Milpitas, CA (US); Robert W. Sherwood, Palo Alto, CA (US); Mandeep Singh Dhami, San Jose, CA (US); Michael Cohen, Sunnyvale, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 0 days.

(21) Appl. No.: 14/142,283

(22) Filed: Dec. 27, 2013

(65) Prior Publication Data
US 2015/0188770 A1    Jul. 2, 2015

(51) Int. Cl.
*H04L 12/851* (2013.01)
*H04L 12/24* (2006.01)
*H04L 12/713* (2013.01)
*H04L 12/931* (2013.01)
*H04L 12/715* (2013.01)

(52) U.S. Cl.
CPC ......... *H04L 41/0893* (2013.01); *H04L 45/586* (2013.01); *H04L 47/2408* (2013.01); *H04L 45/64* (2013.01); *H04L 49/70* (2013.01)

(58) Field of Classification Search
CPC .................................................. H04L 47/2425
USPC ........................................................ 370/254
See application file for complete search history.

(56) References Cited

U.S. PATENT DOCUMENTS

| | | | |
|---|---|---|---|
| 6,674,756 B1 | 1/2004 | Rao et al. | |
| 8,576,840 B2 * | 11/2013 | Larsen et al. | 370/389 |
| 8,650,618 B2 | 2/2014 | Asati et al. | |
| 8,660,129 B1 | 2/2014 | Brendel et al. | |

(Continued)

FOREIGN PATENT DOCUMENTS

| | | |
|---|---|---|
| EP | 2482496 | 8/2012 |
| WO | 2013138977 | 9/2013 |

OTHER PUBLICATIONS

Maier et al., U.S. Appl. No. 14/337,178, filed Jul. 21, 2014.

*Primary Examiner* — Wei Zhao
(74) *Attorney, Agent, or Firm* — Treyz Law Group, P.C.; Michael H. Lyons

(57) ABSTRACT

A controller implemented on computing equipment may be used to control switches in a network. End hosts and service devices may be coupled to the switches in the network. The controller may generate a virtual network topology of virtual switches and virtual routers. The controller may control the virtual routers and/or virtual switches to perform service insertion. The controller may perform service insertion by controlling the virtual routers and/or virtual switches to redirect network traffic through one or more selected service devices. The controller may determine which network traffic is to be redirected to which service devices based on a service insertion policy that identifies network traffic and services to be performed on the network traffic.

15 Claims, 16 Drawing Sheets

(56) References Cited

U.S. PATENT DOCUMENTS

| | | |
|---|---|---|
| 8,804,748 B2 | 8/2014 | Jia et al. |
| 8,812,726 B2 | 8/2014 | Khalid et al. |
| 9,014,184 B2* | 4/2015 | Iwata et al. ............... 370/389 |
| 2008/0198849 A1 | 8/2008 | Guichard et al. |
| 2010/0254385 A1 | 10/2010 | Sharma et al. |
| 2013/0070762 A1 | 3/2013 | Adams et al. |
| 2014/0321459 A1* | 10/2014 | Kumar et al. ............ 370/360 |

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * | | SEND TO PORT 3 |
| * | * | * | * | 172.12.3.4 | * | * | ⋮ | SEND TO PORT 4 |
| * | * | * | * | * | * | 80 | | DROP |

FIG. 4

SYSTEMS AND METHODS FOR PERFORMING NETWORK SERVICE INSERTION

BACKGROUND

This relates to communication networks, and more particularly, to communications networks having network switches that are controlled by a controller.

Packet-based networks such as the Internet and local data networks that are connected to the internet include network switches. Network switches are used in forwarding packets from packet sources to packet destinations. The packets may be sometimes referred to as frames. For example, data is forwarded over layer 2 of the Open Systems Interconnection (OSI) model as frames (e.g., Ethernet frames), whereas data is forwarded over layer 3 of the OSI model as packets (e.g., Internet Protocol packets).

It can be difficult or impossible to configure the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

Networks may include service devices that perform services such as firewalling and packet monitoring on network packets that pass through the service devices. Typically, a network administrator is required to manually configure switches in the network to forward network packets through desired service devices. This process can be time-consuming, tedious, and increasingly challenging, especially with increasing network complexity.

SUMMARY

A controller implemented on computing equipment may be used to control switches in a network. The switches may include physical switches and logical switches such as hypervisor switches. End hosts and service devices may be coupled to the switches in the network. The controller may perform service insertion by redirecting network traffic through one or more selected service devices. The controller may determine which network traffic is to be redirected to which service devices based on a service insertion policy that identifies network traffic and services to be performed.

The controller may generate a virtual network topology of virtual switches and virtual routers. The controller may form virtual switches from respective groups of end hosts. A virtual switch may include ports from at least two underlying switches that are coupled to end hosts of the group associated with the virtual switch. The virtual switch may include virtual ports that are coupled to end hosts. The controller may form one or more virtual routers from groups of virtual switches. A virtual router may include virtual interfaces that are coupled to virtual switches and other virtual routers. Each virtual interface may be assigned a respective Ethernet address and associated with a respective IP domain. The virtual routers may perform network routing operations in routing network packets between end hosts of the different IP domains. The virtual switches and virtual routers may each be distributed over multiple underlying switches (e.g., physical and hypervisor switches) such that any given switch may be configured to perform functions of one or more virtual switches and virtual routers.

The controller may control the virtual routers and/or virtual switches to perform service insertion. The controller may configure a virtual router to perform service insertion by rewriting Ethernet addresses of selected network packets to redirect the network packets through one or more service devices. The controller may configure a virtual switch to perform service insertion by tagging network packets to redirect the network packets through one or more service devices.

Further features of the present invention, its nature and various advantages will be more apparent from the accompanying drawings and the following detailed description.

BRIEF DESCRIPTION OF THE DRAWINGS

FIG. 4 is a diagram of an illustrative flow table of the type that may be used by a packet processing system showing three illustrative types of packet forwarding that may be performed based on the flow table entries of the flow table in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller such as a controller server or distributed controller server may interact with each of the control clients over respective network links. The use of a cross-platform controller and corresponding controller clients allows potentially disparate network switch equipment to be centrally managed.

Figure 1:
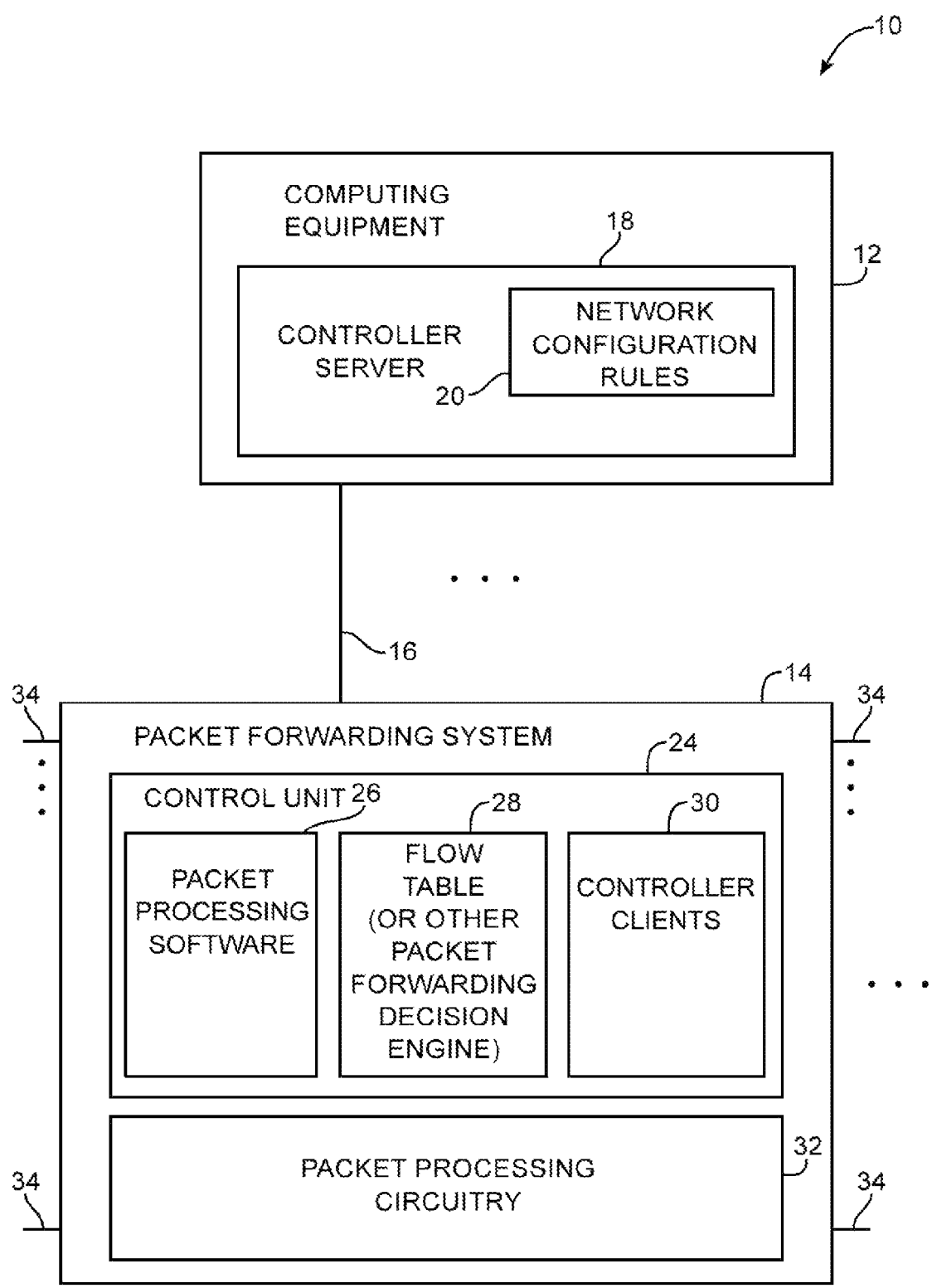
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. As another example, rules 20 may include service insertion policies identifying network traffic and services that are to be performed on the identified network traffic. Rules 20 may, for example, be maintained in a database at computing equipment 12.

Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0, 1.3.1, or other versions of the OpenFlow protocol). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Any desired switch may be provided with controller clients that communicate with and are controlled by a controller server. For example, switch 14 may be implemented using a general purpose processing platform that runs control software and that omits packet processing circuitry 32. As another example, switch 14 may be implemented using control circuitry that is coupled to one or more high-speed switching integrated circuits ("switch ICs"). As yet another example, switch 14 may be implemented as a line card in a rack-based system having multiple line cards each with its own packet processing circuitry. The controller server may, if desired, be implemented on one or more line cards in the rack-based system, in another rack-based system, or on other computing equipment that is coupled to the network.

Figure 2:
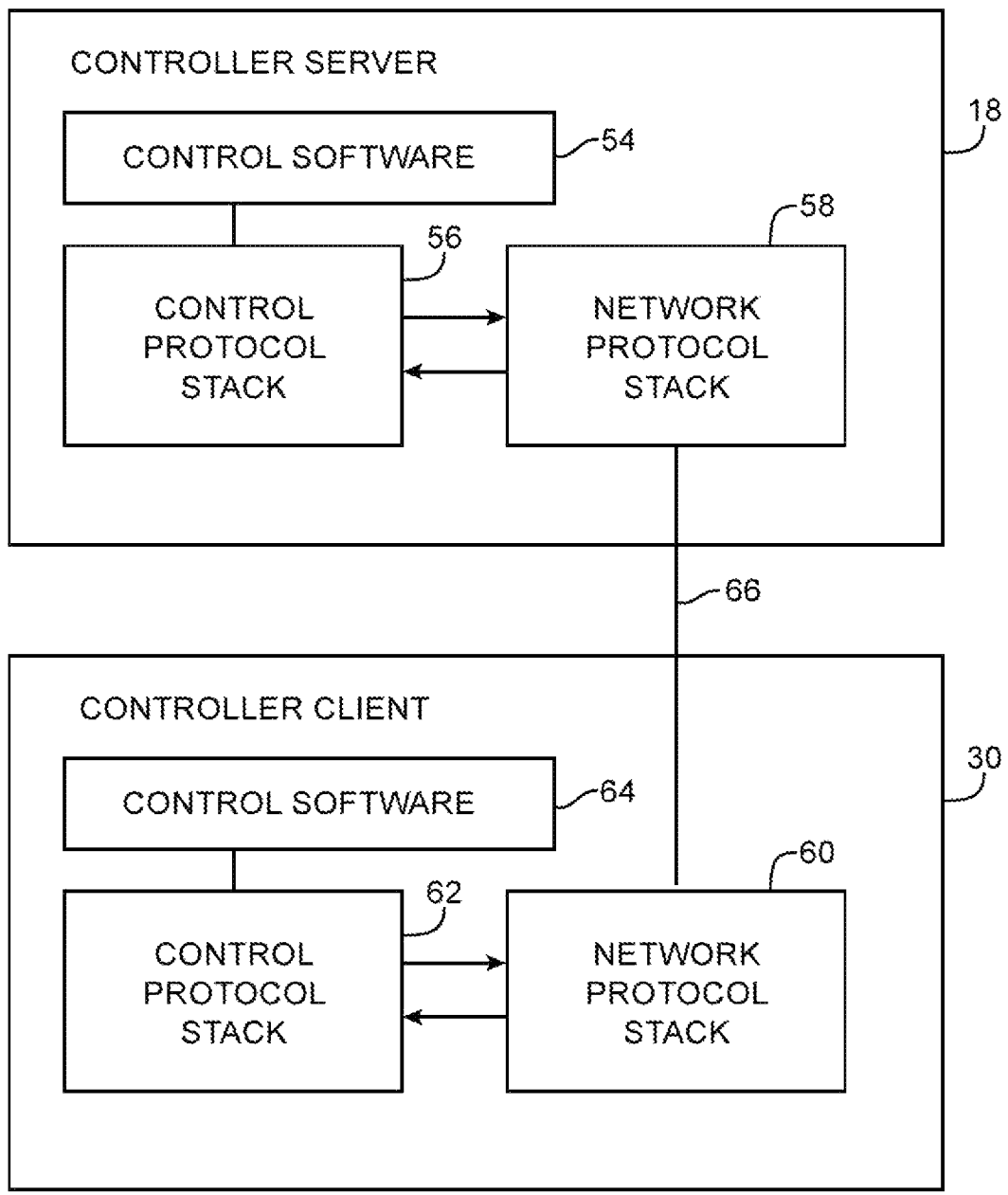
FIG. 2 is a diagram of a controller server and controller client that may communicate over a network connection in accordance with an embodiment of the present invention.

As shown in FIG. 2, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a backbone path in a rack-based system. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 2, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 3:
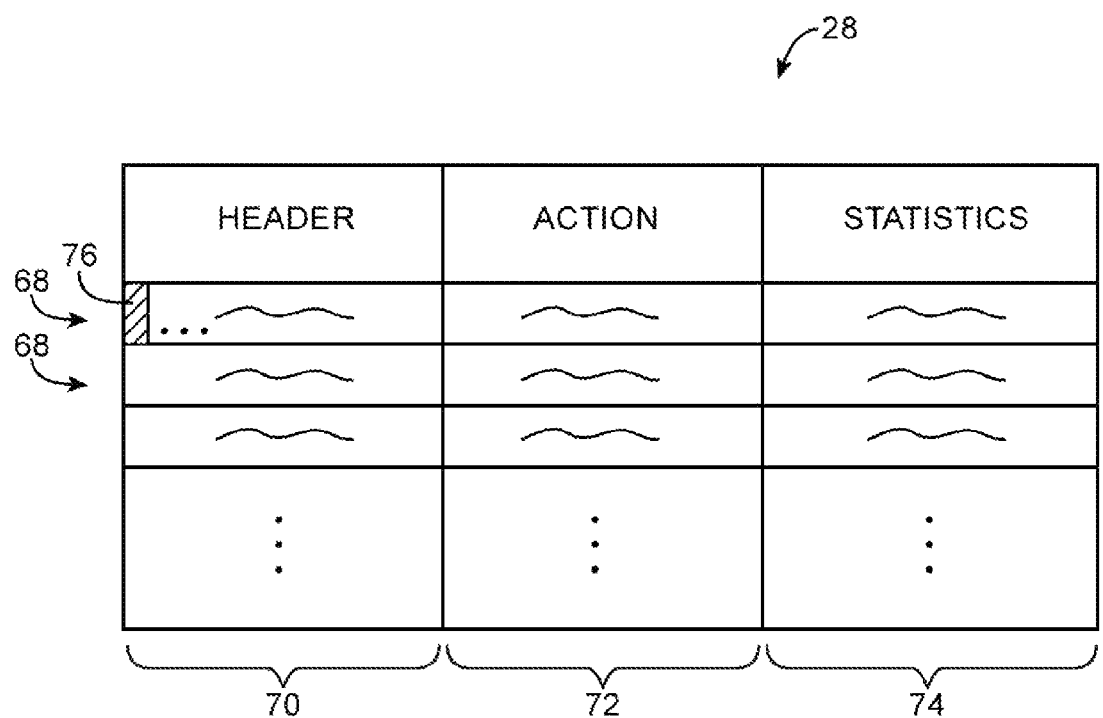
FIG. 3 is a diagram of an illustrative flow table of the type that may be used by a packet processing system in accordance with an embodiment of the present invention.

An illustrative flow table is shown in FIG. 3. As shown in FIG. 3, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port. The modify-field actions may be used in rewriting portions of network packets that match the flow table entry.

FIG. 4 is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets).

The entry of the first row of the FIG. 4 table directs the switch in which the flow table entry is operating to perform Ethernet switching. In particular, incoming packets with matching Ethernet destination addresses are forwarded to port 3.

The entry of the second row of table of FIG. 4 illustrates how a switch may be configured to perform internet routing (i.e., packets are forwarded based on their destination IP address).

The third row of the table of FIG. 4 contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 4 may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate flow table entries to form a path through the network.

Figure 5:
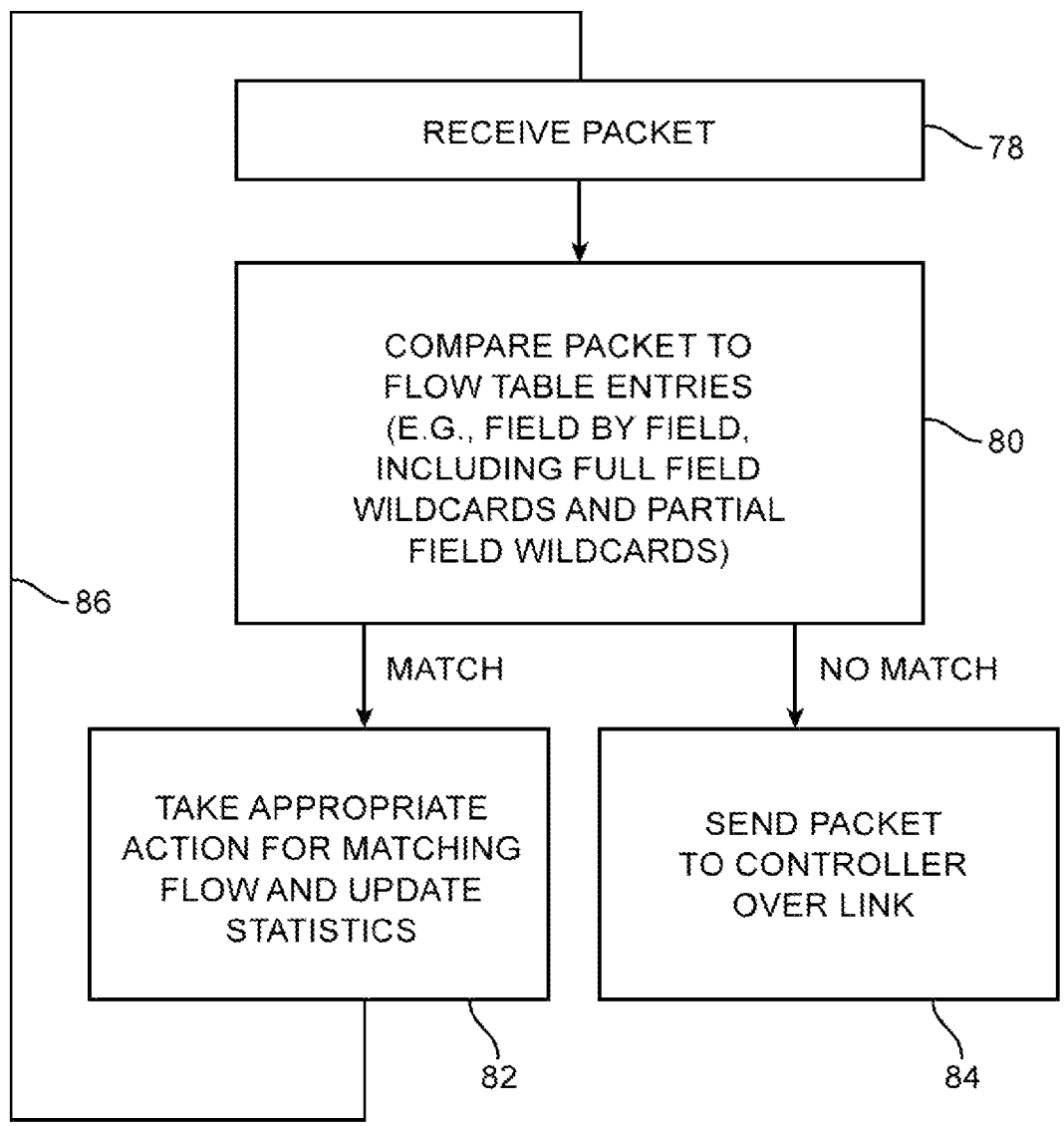
FIG. 5 is a flow chart of illustrative steps involved in processing packets in a packet processing system in accordance with an embodiment of the present invention.

Illustrative steps that may be performed by switch 14 in processing packets that are received on input-output ports 34 are shown in FIG. 5. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 6:
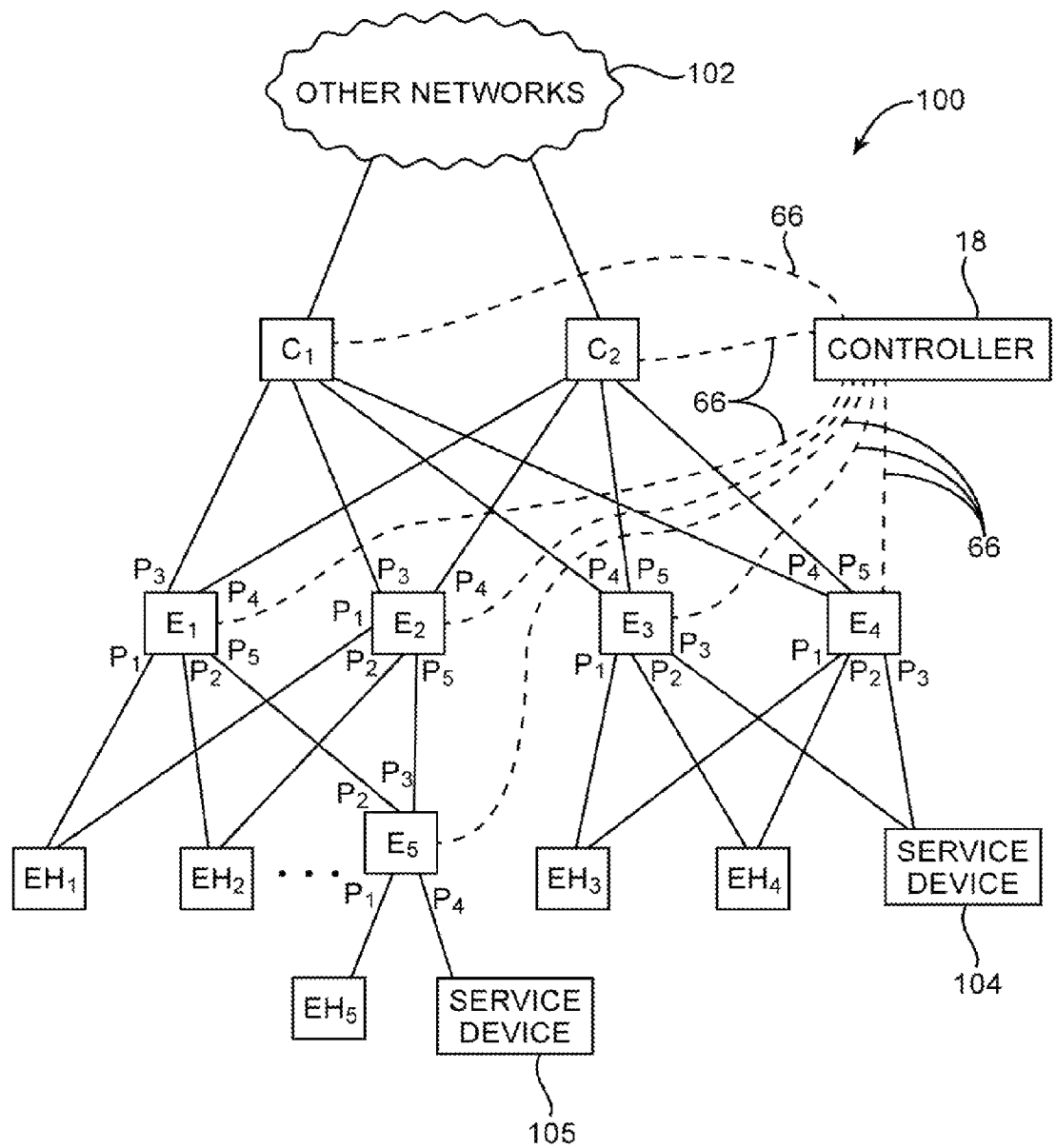
FIG. 6 is a diagram of an illustrative network having switches that may be controlled by a controller to perform service insertion in accordance with an embodiment of the present invention.

FIG. 6 is a diagram of an illustrative network 100 in which switches may be controlled by a controller 18. Controller 18 may be a controller server or a distributed controller implemented across multiple computing equipment. As shown in FIG. 6, network 100 may include switches C1, C2, E1, E2, E3, E4, and E5. Controller 18 may be coupled to the switches of network 100 via control paths 66. Controller 18 may control the switches using control paths 66 (e.g., by providing flow table entries such as flow table entries 68 of FIG. 3).

Network 100 may include end hosts such as end hosts EH1, EH2, EH3, EH4, and EH5 that are coupled to the switches of network 100. Switches that are directly coupled to end hosts may sometimes be referred to as edge switches, whereas switches that merely interconnect other switches and are not directly coupled to the end hosts may be referred to as core switches. In the example of FIG. 6, switches E1, E2, E3, E4, and E5 are edge switches, because they are coupled to end hosts. Switches C1 and C2 are core switches, because switches C1 and C2 interconnect switches E1, E2, E3, E4, and E5 and are not directly coupled to end hosts. Core switches such as switches C1 and C2 may couple network 100 to other networks 102 (e.g., other networks including switches and end hosts). The example of FIG. 6 in which edge switches are directly coupled to core switches are merely illustrative. If desired, additional switches may be interposed between the edge and core switches.

Service devices such as service devices 104 and 105 may be coupled to switches of network 100. In the example of FIG. 6, service device 104 is coupled to port P3 of edge switch E3 and port P3 of edge switch E4, whereas service device 105 is coupled to port P4 of switch E5. Service devices may include firewalls, load-balancers, network address translation devices, intrusion detection devices, intrusion prevention devices, encryption/decryption devices, monitoring devices, or any network device that performs services on network packets provided to the service device. For example, a firewall device 104 may be configured with rules that specify a predetermined set of packet characteristics. In this scenario, firewall device 104 may match packets received from port P3 of edge switch E3 to the rules and provide only the matching packets to port P3 of edge switch E4 (i.e., packets that do not satisfy the set of packet characteristics may be ignored or dropped). As another example, a monitoring device or intrusion detection device 104 may monitor incoming network traffic on port P3 of edge switch E4 and produce data such as statistics on the network traffic. In some scenarios, service devices may manipulate network traffic flows by replacing, removing, or otherwise modifying information stored in network packets of the traffic flows. For example, an encryption device 104 may encrypt network packets in the network traffic flows for secure communications, whereas a decryption device 104 may decrypt network packets in the network traffic flows.

The example of FIG. 6 in which service device 104 is coupled to multiple edge switches is merely illustrative. If desired, a service device may be coupled to only a given port of an edge switch. In this scenario, the service device may process packets received at the given port and provide the processed packets to the given port or may only process the packets without providing any network traffic to the given port. In general, a service device may be coupled to any desired number of ports and edge switches.

Figure 7:
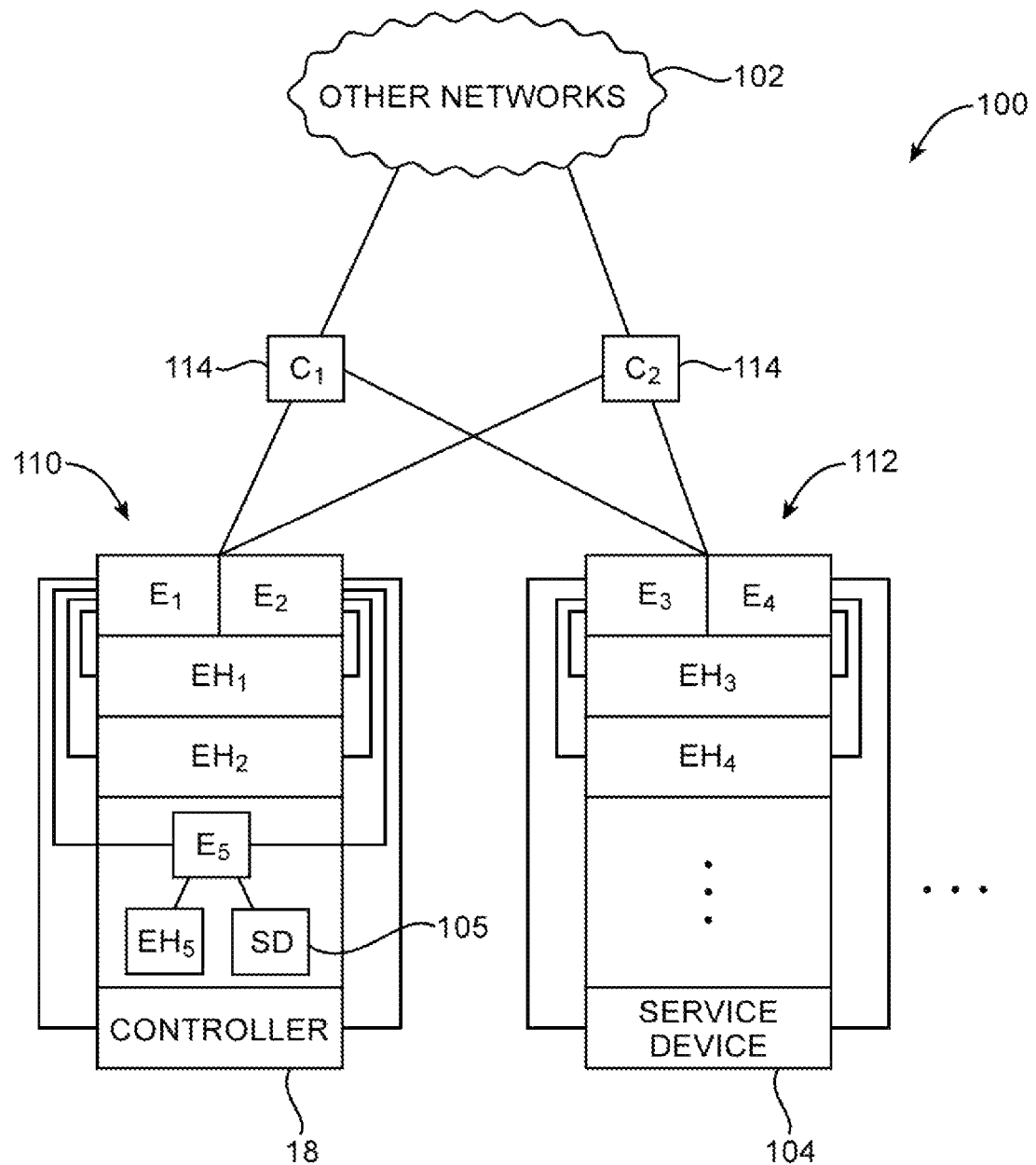
FIG. 7 is a diagram of an illustrative rack-based system that implements a network having switches that may be controlled by a controller to perform service insertion in accordance with an embodiment of the present invention.

FIG. 7 is an illustrative example of network 100 of FIG. 6 that is implemented using rack-based systems. As shown in FIG. 7, edge switches and end hosts may be implemented using network racks 110 and 112 that are coupled to switches 114 (e.g., core switches as shown in FIG. 7). If desired, network 100 may include additional network racks that house additional end hosts and switches and are coupled to switches 114. Network rack 110 may include edge switches E1 and E2 and end hosts EH1 and EH2, whereas network rack 112 may include edge switches E3 and E4 and end hosts EH3 and EH4. Edge switches E1, E2, E3, and E4 may serve as top-of-rack switches that are coupled via network paths to each end host of the corresponding network rack 112. For example, top-of-rack switch E3 is connected to each of the end hosts of network 112 (e.g., end hosts EH3 and EH4).

Each top-of-rack switch serves as an interface between end hosts of the corresponding network rack and other network devices such as other portions of network 100 or other networks 102. Network traffic to or from for end hosts of network rack 110 may be required to traverse at least one of the top-of-rack switches of network rack 110 (e.g., top-of-rack switches E1 and E2). Similarly, network traffic of network rack 112 may be required to traverse at least one of switches E3 and E4. As an example, network packets sent by end host EH1 to end host EH3 may be forwarded by top-of-rack switch E1, core switch C1, and top-of-rack switch E3. As another example, network packets sent by end host EH1 to end host EH3 may be forwarded by top-of-rack switch E2, core switch C1, and top-of-rack switch E4.

If desired, switches may be implemented using computing equipment of network racks 110 and 112. Switch E5 may be implemented using computing equipment such as a line card of network rack 110. Software switch E5 may sometimes be referred to as a hypervisor switch. Hypervisor switches may be implemented using dedicated circuitry or using software on discrete computing equipment (e.g., on a line card). However, such software switches are coupled to the rest of the network by cables plugged into dedicated physical ports of the computing equipment on which the software switch is implemented.

Switch E5 may interface with end hosts such as end host EH5 and service devices such as service device 105 that are implemented on the same computing equipment as switch E5. In other words, shared computing equipment may be used to implement switch E5, end host EH5, and service device 105. If desired, multiple end hosts may be implemented in software on the shared computing equipment. For example, tens, hundreds, thousands, or more end hosts may be implemented on the shared computing equipment and logically coupled in software to logical ports of software switch E5, whereas software switch E5 is connected to network 100 by physical ports of the computing equipment on which software switch E5 is implemented.

As shown in FIG. 7, controller 18 may be implemented in network rack 110 (e.g., using the resources of a line card or other computing equipment of network rack 110). Controller 18 may communicate with the top-of-rack switches and core switches by sending control packets and receiving control plane packets from the switches. In this scenario, one or more switches of network 100 may form portions of control paths 66 of FIG. 6. For example, switch E1 or switch E2 may serve as part of control paths between core switches C1 and C2 and controller 18. As another example, switches E1, E2, C1, and C2 may form portions of control paths between controller 18 and switches E3 and E4.

Edge switches such as E1, E2, E3, and E4 that are coupled to multiple end hosts are sometimes referred to as leaf switches. For example, top-of-rack switches in a rack-based system are sometimes referred to as leaf switches. Switches 114 that are coupled to each of the leaf switches are sometimes referred to as spine switches. Spine switches may be core switches that are not connected to any end hosts (e.g., as shown in FIG. 7) or may have one or more ports that are connected to end hosts.

Figure 8:
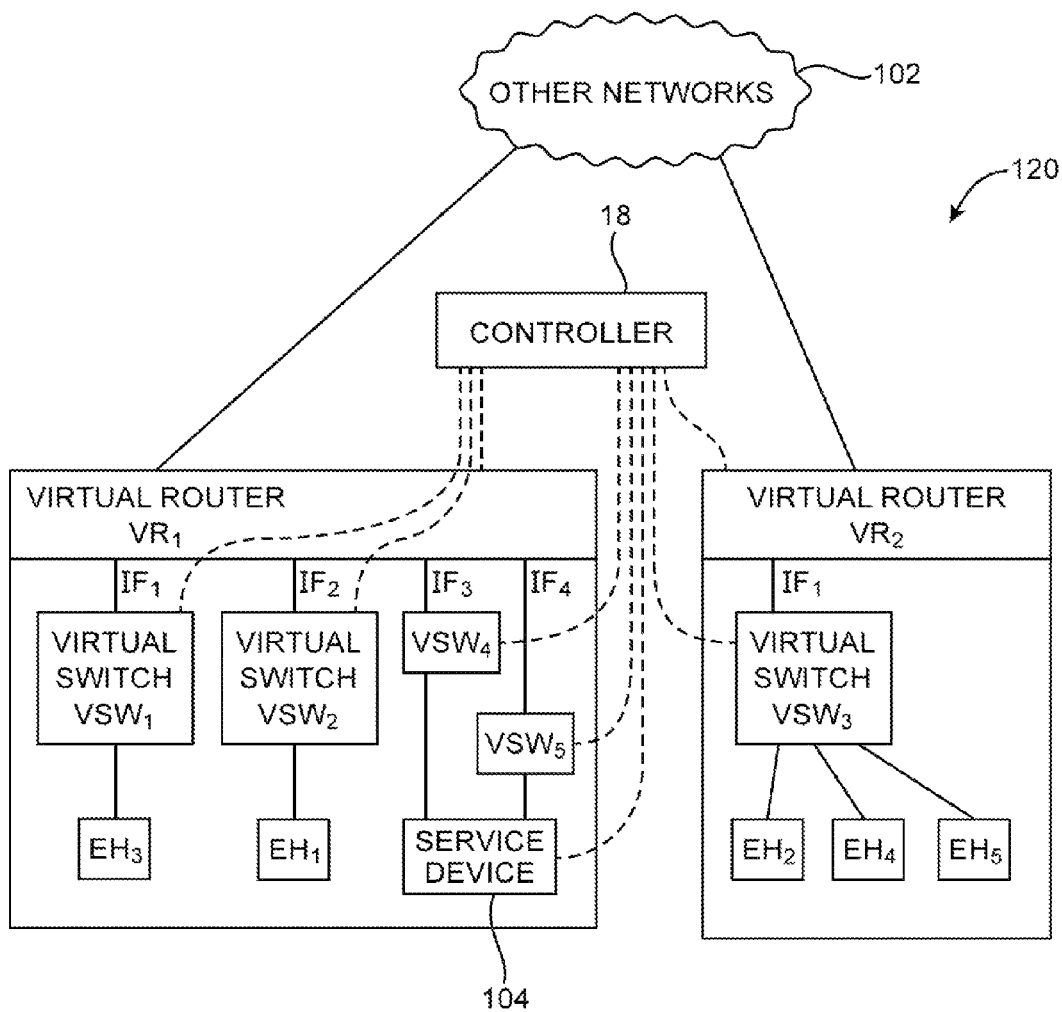
FIG. 8 is a diagram of an illustrative virtual network that may be generated by a controller from the network of FIG. 6 in accordance with an embodiment of the present invention.

It can be challenging for a user such as network administrator to configure network 100 for desired operations. For example, it can be desirable to isolate or otherwise limit communications between groups of end hosts. As another example, it can be inefficient for a network administer to manually configure network policy or routing rules for each switch and each end host of the network. Controller 18 may be configured to implement a logical network topology of virtual routers and virtual switches over the underlying physical network topology. The logical network topology may provide benefits such as improved network configuration efficiency, flexibility, and capabilities. FIG. 8 is an illustrative example in which controller 18 is configured to implement a virtual network 120 from the underlying network 100 of FIGS. 6 and 7.

The virtual network topology of virtual network 120 may be any desired topology within the physical constraints of underlying network 100 (e.g., each virtual path has at least one if not more corresponding paths in the underlying network). The underlying network may include physical switches and/or software-based switches such as hypervisor switch E5.

As shown in FIG. 8, virtual network topology 120 may include virtual switches such as virtual switches VSW1, VSW2, VSW3, VSW4, and VSW5 and virtual routers such as virtual routers VR1 and VR2. Virtual switches are formed from groups of end hosts of the network and may be defined by any desired network attributes of the end hosts. Virtual switch VSW1 may be assigned end host EH3, virtual switch VSW2 may be assigned end host EH1, and virtual switch VSW3 may be assigned end hosts EH2, EH4, and EH5. In some scenarios, a network device may be assigned to multiple virtual switches. For example, service device 104 may be assigned to virtual switches VSW4 and VSW5. Controller 18 may differentiate between the assignments to virtual switches VSW4 and VSW5 using the attachment points of service device 104 (e.g., the connection between device 104 and port P3 of physical switch E3 may be assigned to virtual switch VSW4, whereas the connection between device 104 and port P3 of physical switch E4 may be assigned to virtual switch VSW5).

Each virtual switch may be implemented as a distributed logical switch across one or more underlying switches (e.g., underlying physical or hypervisor switches). For example, virtual switches may include end hosts that are attached to different physical switches. In this scenario, the controller may control multiple physical switches in controlling a single virtual switch. Control of different virtual switches may involve controlling two sets of potentially overlapping sets of underlying physical and/or hypervisor switches (e.g., a physical switch may be controlled in performing operations associated with different virtual switches).

Examples of network attributes that may be used in characterizing an end host include the physical or hypervisor switch port to which the end host is coupled, a hardware address of the end host (e.g., a MAC address), a protocol address of the end host (e.g., an IP address), a virtual local area network (VLAN) tag, and/or other network attributes of the end host. For example, controller 18 may identify end host EH1 as attached to port P1 of switch E1, may identify end hosts EH2 and EH3 by MAC address, and may identify end host EH4 as attached for port P2 of switch E3. As another example, end host EH5 may be identified as attached to logical port P1 of hypervisor switch E5. This example is merely illustrative. Any desired network attribute such as used in network packet header fields or any desired combination of network attributes may be used in forming virtual switches.

Virtual switches may be grouped to form virtual routers. In the example of FIG. 8, virtual switches VSW1, VSW2, VSW4, and VSW5 are grouped to form virtual router VR1, whereas virtual switch VSW3 is assigned to virtual router VR2. In other words, the groups of end hosts of virtual switches VSW1, VSW2, VSW4, and VSW5 are assigned to virtual router VR1, whereas the group of end hosts of virtual switch VSW3 is assigned to virtual router VR2. Each virtual switch is connected to the corresponding virtual router via a virtual router interface. Virtual switches VSW1, VSW2, VSW4, and VSW5 are connected to respective virtual router interfaces IF1, IF2, IF3, and IF4 of virtual router VR1, whereas virtual switch VSW3 is connected to virtual router interface IF1 of virtual router VR2.

Each virtual switch serves to implement a respective broadcast domain in which broadcast network packets are forwarded to all end hosts of the virtual switch. The broadcast network packets may be network packets having header fields identifying the network packets as broadcast network packets that are destined for all end hosts of an associated broadcast domain. For example, broadcast network packets received by virtual switch VSW3 from end host EH2 may be forwarded by virtual switch VSW3 to each other end host that is assigned to virtual switch VSW3 (i.e., to end host EH4 and end host EH5).

Virtual routers perform network routing functions and provide isolation for the different broadcast domains of the virtual switches. For example, virtual router VR1 may prevent broadcast packets from being forwarded by virtual switch VSW1 to virtual switch VSW2 (and vice versa). The broadcast domains may be defined in terms of IP address ranges such that each interface of a given virtual router is assigned a different respective IP address range. For example, a first IP address range may be assigned to interface IF1 and virtual switch VSW1, whereas a second IP address range may be assigned to interface IF2 and virtual switch VSW2. In contrast to virtual routers, virtual switches do not perform any network routing functions based on IP domains.

Network routing functions that may be performed by a virtual router include modifying headers of network packets received at interfaces of the virtual router. The virtual router may decrement a time-to-live IP header field of the network packet. The virtual router may modify Ethernet headers such as source and destination MAC address fields to correspond with a desired broadcast domain. For example, each interface of the virtual router may be assigned a respective Ethernet address. In this scenario, the virtual router may rewrite the source MAC address fields to match the egress (outgoing) interface of the virtual router. The virtual router may rewrite the destination MAC address field to match a next-hop address.

Figure 9:
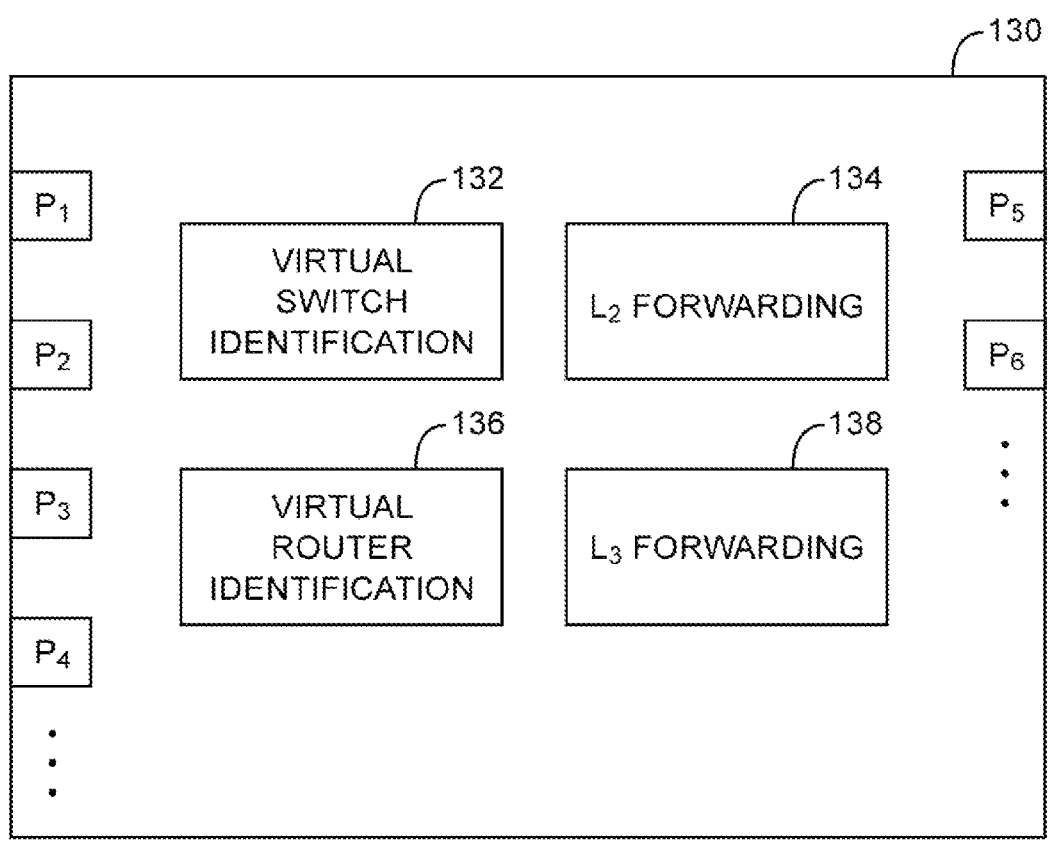
FIG. 9 is a diagram of an illustrative switch having modules that each perform a subset of packet forwarding operations in accordance with an embodiment of the present invention.

FIG. 9 is an illustrative block diagram of a switch 130 such as a physical or hypervisor switch. Switch 130 may, for example, be an edge switch such as edge switch E1, E2, E3, or E4 of FIG. 6 or may be a core switch such as switches C1 or C2. As shown in FIG. 9, switch 130 may include ports such as ports P1, P2, P3, P4, P5, P6, etc. Switch 130 may include virtual switch identification module 132, L2 forwarding module 134, virtual router identification module 136, and L3 forwarding module 138. The modules may be implemented using respective dedicated circuitry, may be implemented using shared dedicated circuitry, or may be implemented using software on processing circuitry. For example, these modules may be implemented using packet processing software 26 of FIG. 1 and/or packet processing circuitry 32 and may perform functions based on flow table entries provided by a controller.

A network packet received at one of the switch ports may be processed by one or more of the modules in determining how to forward the network packet. The modules may process the network packet in any desired sequence or in parallel. The operations performed by each module may be controlled by a controller.

Virtual switch identification module 132 may determine which virtual switch the network packet is assigned to based on network attributes associated with the network packet (e.g., incoming port, source address information such as Ethernet or IP source address, etc.). Module 132 may provide information identifying the virtual switch to L2 forwarding module 134. L2 forwarding module 134 may perform network forwarding based on the virtual switch information provided by module 132 (e.g., forwarding decisions at layer 2 of the Open Systems Interconnection "OSI" model). For example, L2 forwarding module 134 may determine which switch port the network packet should be forwarded to based on the virtual switch information and additional packet information such as a destination MAC address retrieved from the network packet.

In scenarios such as when destination end host is associated with a different virtual switch than the source end host, virtual router identification module 136 and L3 forwarding module 138 may be used. For example, network packets received by switch E3 from end host EH3 that are destined for end host EH1 may be processed using L3 forwarding module 138, because end host EH3 is assigned to virtual switch VSW1, whereas end host EH1 is assigned to virtual switch VSW2. In other words, the IP domain of interface IF1 that is associated with end host EH3 is different from the IP domain of interface IF2 that is associated with end host EH1. In these scenarios, network routing at the IP layer (e.g., level 3 of the OSI model) may be required.

Virtual router identification module 136 may identify which virtual router should be used in controlling the network packet. Module 136 may use network attributes of the network packet along with information received from other modules of the switch. For example, module 136 may use identified virtual switch information received from L2 forwarding module 134 along with IP address information retrieved from the network packet in determining which virtual router controls the network packet.

Virtual router identification module 136 may provide identified virtual router information to L3 forwarding module 138. L3 forwarding module 138 may perform network routing operations based on the identified virtual router information and based on additional information retrieved from the network packet. As an example, L3 forwarding module 138 may use IP header fields such as destination address fields to determine which port of the switch should be used in forwarding the network packet. In performing network routing operations, L3 forwarding module 138 may modify the network packet. For example, module 138 may decrement a TTL header field and may rewrite layer 2 header fields such as source and destination MAC addresses.

Consider the scenario in which a network packet received at switch E2 from end host EH1 is destined for end host EH3. In this scenario, the network packet may include the MAC address of end host EH1 as a source MAC address, the MAC address of virtual router VR1 as the destination MAC address (because end host EH1 is coupled to a different L3 interface of virtual router VR1 than end host EH3 and does not have access to the MAC address of end host EH3), the IP address of end host EH1 as a source IP address, and the IP address of end host EH3 as a destination IP address. Virtual router identification module 136 may determine that the source end host (EH1) is coupled to interface IF2 of virtual router VR1 via virtual switch VSW2 (e.g., based on flow table entries provided by a controller). L3 forwarding module 138 may determine that destination end host EH3 is coupled to interface IF1 of virtual router VR1 and perform network routing operations in routing the network packet to end host EH3 via interface IF1 of virtual router VR1 (e.g., based on flow table entries provided by a controller). The network routing operations may include decrementing a TTL field of the network packet and rewriting the source and destination MAC addresses of the packet. In particular, the source MAC address may be rewritten from the MAC address of end host EH1 to the MAC address of interface IF1 of virtual router VR1, whereas the destination MAC address may be rewritten from the MAC address of interface IF2 of virtual router VR1 to the MAC address of end host EH3.

The modules of the switch may collectively implement a flow table such as flow table 28 for the switch. For example, flow table entries operating only on layer 2 header fields may be implemented using virtual switch identification module 132 and L2 forwarding module 134. As another example, flow table entries operating only on layer 3 header fields may be implemented using virtual router identification module 136 and L3 forwarding module 138. As yet another example, flow table entries operating on both layer 2 and layer 3 header fields may be implemented using identification module 132, L2 forwarding module 134, virtual router identification module 136 and L3 forwarding module 138.

The example of FIG. 9 in which modules 132, 134, 136, and 138 are implemented separately is merely illustrative. If desired, the functions of any two or more modules may be merged and implemented using shared circuitry. The modules may be implemented as software modules in a software switch such as hypervisor switch E5 of FIG. 7 or may be implemented using dedicated circuitry. Each switch 130 may be capable of performing both network forwarding and network routing, which helps to allow a controller to implement distributed virtual switches and virtual routers.

Figure 10:
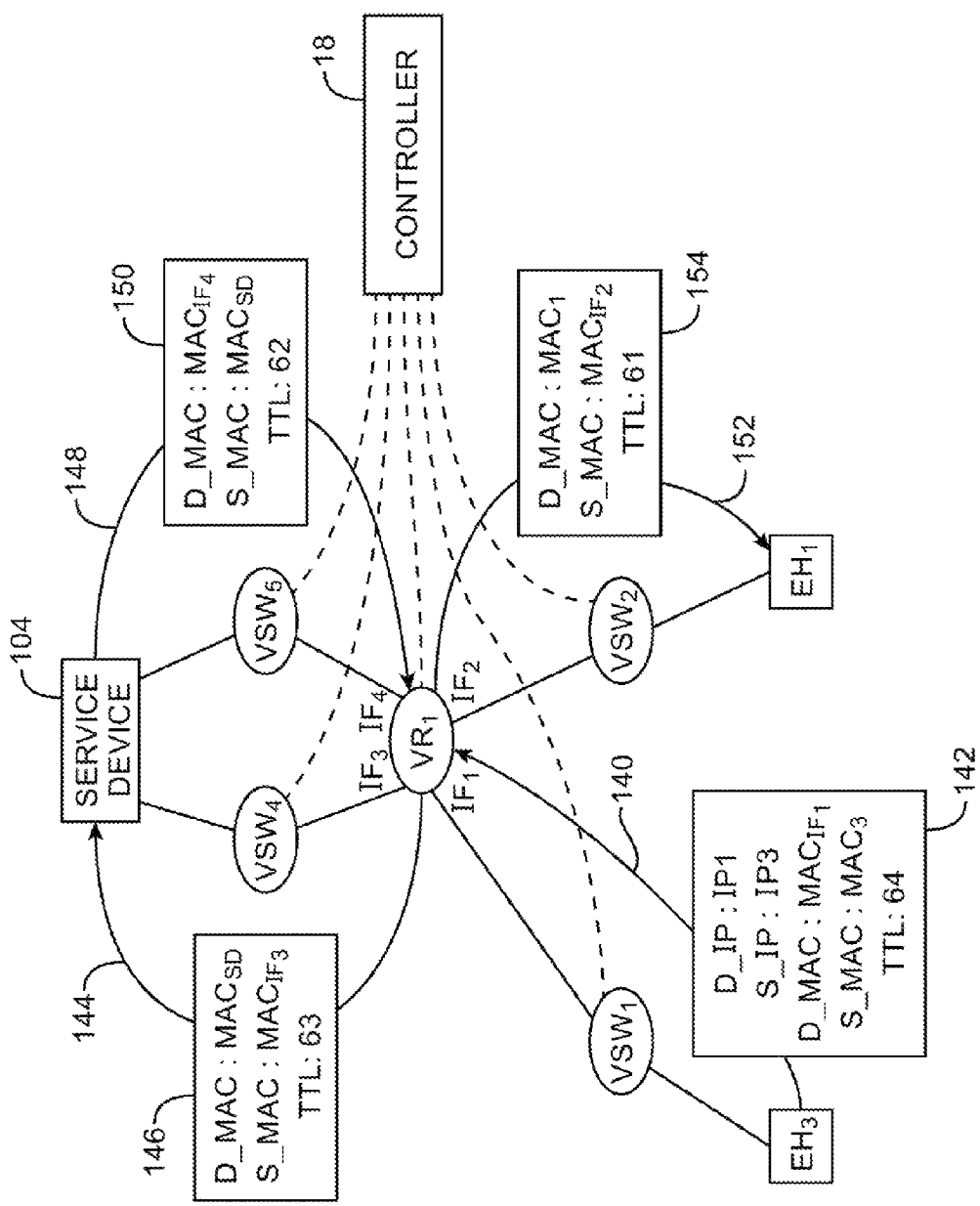
FIG. 10 is a diagram showing how a virtual network topology may include a virtual router that may be controlled by a controller to perform service insertion in accordance with an embodiment of the present invention.

In some scenarios, it may be desirable to forward network traffic through one or more service devices. For example, it may be desirable to route network traffic from one IP domain to another IP domain through a firewall, load balancer, or other service device. A controller may use virtual, distributed routers and switches in directing network traffic through service devices of a network. FIG. 10 is a diagram illustrating how a controller may control virtual routers and virtual switches to route network traffic through a service device. The virtual network topology of FIG. 10 corresponds with FIG. 8 and underlying network topology 100 of FIG. 6. In the example of FIG. 10, elements such as virtual router VR2 have been left out in order to not unnecessarily obscure the description.

In the example of FIG. 10, end host EH3 may send a network packet 142 destined for end host EH1 at step 140 (shown as an arrow). Network packet 142 may include the IP address of end host EH1 (IP1) as a destination IP address and the IP address of end host EH3 (IP3) as a source IP address. Packet 142 may include the MAC (e.g., Ethernet) address of end host EH3 as a source MAC address and an initial TTL value of 64 (or any desired initial value). End host EH3 is associated and coupled to a different L3 interface of virtual router VR1 than end host EH1. End host EH3 therefore does not have access to the MAC address of end host EH1 and may include the MAC address of interface IF1 of virtual router VR1 (MACIF1) as the destination MAC address of network packet 142. In other words, virtual router VR1 serves as an interface between the IP domain of end host EH3 and the IP domain of end host EH1.

Based on the destination MAC address field of packet 142, virtual switch VSW1 may pass network packet 142 to interface IF1 of virtual router VR1. Layer 3 header fields such as IP header fields may be ignored by the virtual switch during processing. Virtual router VR1 may receive packet 142 at interface IF1 and perform network routing operations on the packet. Based on control data from the controller, virtual router VR1 may determine that network packet 142 should be routed through service device 104. Virtual router VR1 may modify packet 142 to produce and send modified network packet 146 to service device 104. In the example of FIG. 10, virtual router VR1 may rewrite the destination MAC address of the packet to the MAC address of service device 104 (MACSD), rewrite the source MAC address to the MAC address of interface IF3 of virtual router VR1 (MACIF3), and decrement the TTL header field to 63.

Virtual router VR1 may send modified packet 146 to service device 104 via interface IF3 and virtual switch VSW4. Service device 104 may perform services such as firewalling, intrusion detection, monitoring, or other desired services on network packet 146 to produce and send network packet 150 to virtual router VR1 at interface IF4 via virtual switch VSW5. In performing services on packet 146, service device 104 may maintain the original data from end host EH3. Serviced packet 150 may include MACSD as a source MAC address and the MAC address of interface IF4 (MACIF4) as a destination MAC address. In the example of FIG. 10, service device 104 may decrement the TTL header value. However, this example is merely illustrative. If desired, service device 104 may maintain the TTL header value.

Service device 104 may send serviced packet 150 to interface IF4 of virtual router VR1 during step 148. During steps 140, 144, and 148, the source and destination IP address information in the network packet may be maintained (e.g., virtual router VR1, service device 104, and virtual switches VSW1, VSW4, and VSW5 do not modify the source or destination IP address information in processing the network packet). Virtual router VR1 may use the maintained destination IP address information in serviced packet 150 in determining that the serviced packet should be sent to end host EH1 via interface IF2. Virtual router VR1 may perform network routing operations on the serviced packet. As shown in FIG. 10, virtual router VR1 may rewrite the layer 2 information in serviced packet 150 to produce packet 154 and to align with the IP domain of interface IF2. The destination MAC address may be rewritten with MAC1 (the MAC address of end host EH1), whereas the source MAC address may be rewritten with MACIF2. The TTL header value may be decremented to 61.

The example of FIG. 10 in which virtual router VR1 is configured by controller 18 to route network packet 142 to service device 104 via virtual switch VSW4 and receive the serviced network packet via switch VSW5 is merely illustrative. If desired, service device 104 may be coupled to virtual router VR1 via only a single virtual switch that is used in transmitting network packet 142 to service device 104 and receiving the serviced network packet from service device 104.

Figure 11:
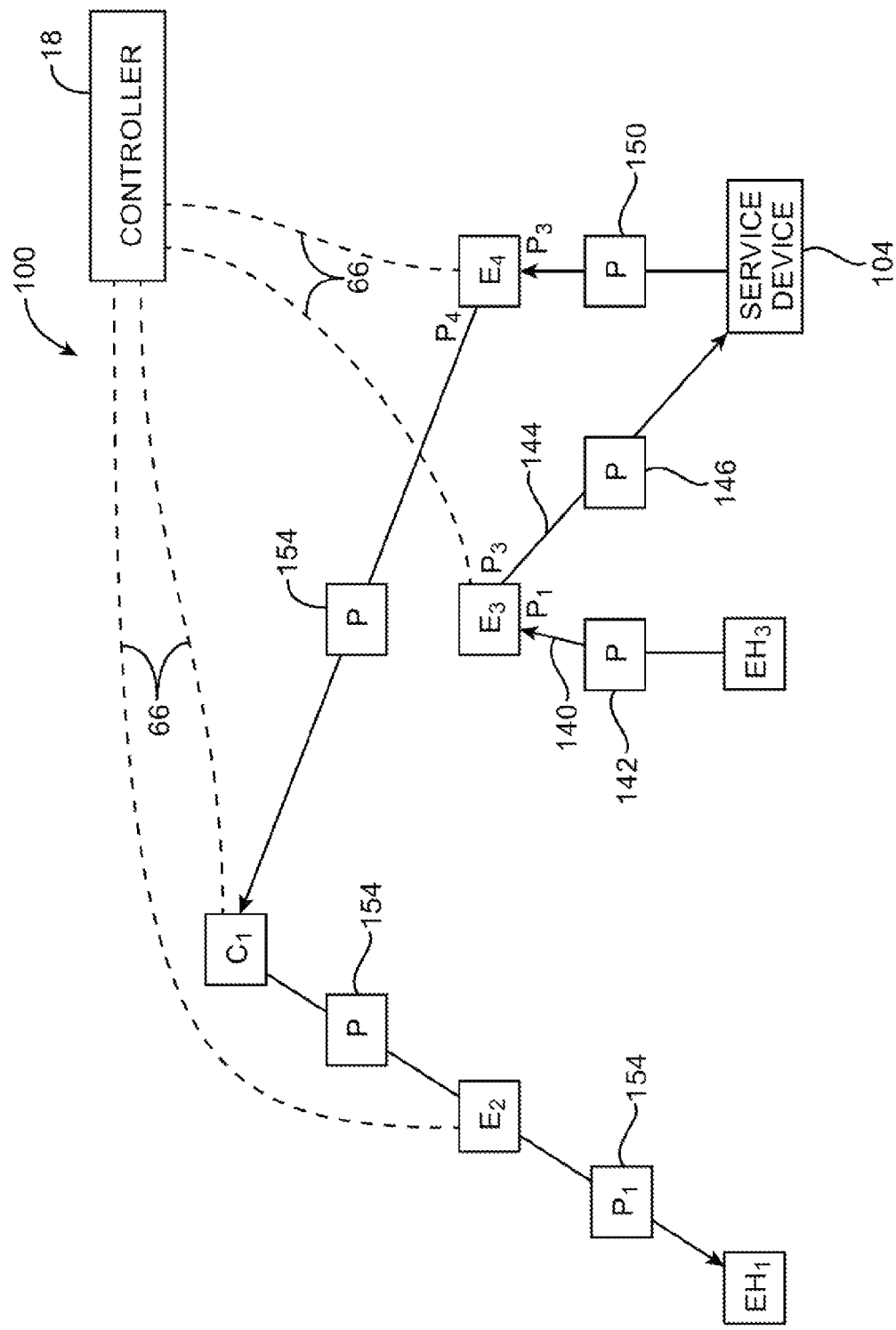
FIG. 11 is a diagram showing how underlying switches of the virtual network topology of FIG. 10 may be controlled in configuring the virtual router to perform service insertion in accordance with an embodiment of the present invention.

Controller 18 may control virtual switches and virtual routers to insert service devices in network traffic flows by providing flow table entries to the underlying switches (e.g., physical switches and hypervisor switches) over which the virtual switches and virtual routers are distributed. FIG. 11 is a diagram showing how the steps performed by virtual router VR1 in FIG. 10 may be translated into steps performed by the underlying switches of the virtual network. Network 100 of FIG. 11 corresponds to network 100 of FIG. 6 and some network elements have been omitted for clarity.

As shown in FIG. 11, end host EH3 may send network packet 142 to switch E3 during step 140. Switch E3 may be configured by controller 18 to modify packet 142 (step 144) and send modified network packet 146 to service device 104. Service device 104 may process packet 146 and provide serviced packet 150 to switch E4 during step 148. Switch E4 may be configured by controller 18 to modify serviced packet 150 to produce packet 154 (e.g., by rewriting source and destination MAC address information to match interface IF2 of virtual router VR1 of FIG. 10). Switches C1 and E2 may be configured by controller 18 to forward network packet 154 from switch E4 to end host EH1.

In the example of FIG. 11, controller 18 configures each of switches E3 and E4 to perform some of the functions of virtual router VR1. The port of switch E3 that is coupled to end host EH3 (i.e., port P1 of switch E3) serves as interface IF1 of virtual router VR1, whereas port P3 of switch E3 that is coupled to service device 104 serves as interface IF3 of virtual router VR1. Similarly, port P3 of switch E4 serves as interface IF4 of virtual router VR1, and port P4 of switch E4 serves as interface IF2 of virtual router VR1. In general, each virtual router interface is associated with a set of one or more end hosts of a virtual switch (e.g., end hosts that are coupled to different ports of different underlying physical or hypervisor switches). Multiple ports of multiple switches may therefore collectively serve as interface IF1 or any other interface of virtual router VR1.

Controller 18 controls physical and hypervisor switches to perform functions of virtual switches. In the example of FIG. 11, controller 18 may configure switch E3 to perform functions of virtual switch VSW1. Controller 18 may configure virtual switch identification module 132 of switch E3 to identify that packets such as packet 142 that are received at port P1 of switch E3 are assigned to virtual switch VSW1. Controller 18 may configure L2 forwarding module 134 of switch E3 to pass packets such as packet 142 that are destined for the MAC address of virtual router VR1 to L3 forwarding module 140 for processing (e.g., because L3 forwarding module 140 is configured to perform routing functions of virtual router VR1). In this way, controller 18 implements virtual switches and virtual routers in a distributed arrangement among the underlying switches (physical and/or hypervisor).

The example of FIG. 11 as representing the underlying network path implemented by controller 18 for the service insertion policy of FIG. 10 is merely illustrative. In general, controller 18 may implement any desired path for the virtual paths of FIG. 10. For example, packet 154 sent from interface IF2 of virtual router VR1 to end host EH1 traverses virtual switch VSW2 of FIG. 10, which corresponds to an underlying path from switch E4 to end host EH1 through switches C1 and E2 as shown in FIG. 11. Alternatively, controller 18 may configure switch E4 to forward packet 154 through switches C2 and E2, through switches C2 and E1, or through switches C1 and E2. If desired, the network packet may be redirected through additional service devices similarly to service device 104.

Figure 12:
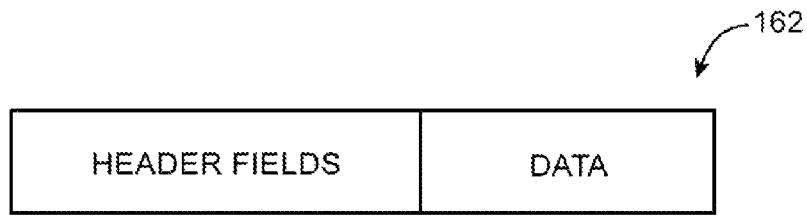
FIG. 12 is a diagram of an illustrative network packet that may be redirected for service insertion in accordance with an embodiment of the present invention.
Figure 15:
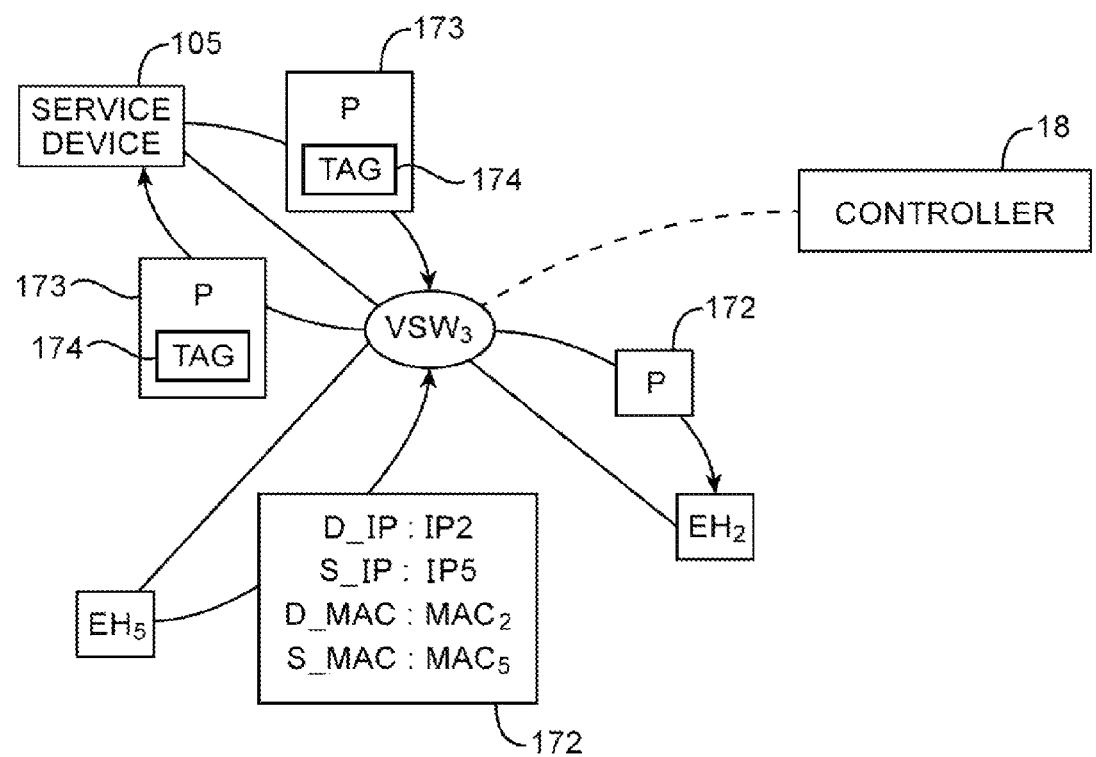
FIG. 15 is a diagram showing how a virtual network topology may include a virtual switch that may be controlled by a controller to perform service insertion in accordance with an embodiment of the present invention.

FIG. 12 is an illustrative diagram of a network packet that may be sent from a source end host to a destination end host. As shown in FIG. 15, network packet 162 may include header fields and data to be conveyed from the source end host to the destination end host over the network. The header fields may include L3 header fields such as a source internet protocol (IP) address, a destination IP address, a TTL field, etc. The header fields may include L2 header fields such as a source Ethernet address, a destination Ethernet address, and a virtual local area network (VLAN) identifier. Network packet 142 of FIG. 10 is an example of a network packet 162 that includes data sent from end host EH3 to end host EH1 and header fields identifying the packet (e.g., D_IP, S_IP, D_MAC, S_MAC, and TTL).

Figure 13:
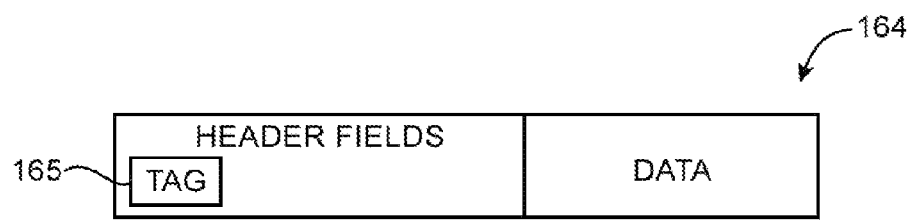
FIG. 13 is a diagram of an illustrative tagged network packet that may be generated in performing service insertion with a virtual switch in accordance with an embodiment of the present invention.
Figure 14:
FIG. 14 is a diagram of another illustrative tagged network packet that may be generated in performing service insertion with a virtual switch in accordance with an embodiment of the present invention.

In the example of FIG. 10, virtual router VR1 routes network packets through service device 104 by rewriting source and destination Ethernet (e.g., MAC) address information of the network packet. Network packet 154 that is received by destination end host EH1 has the same packet data but different L2 header fields than original network packet 142 that was sent by end host EH3. By configuring virtual router VR1 to modify the L2 header fields of network packet 142 to produce network packet 146, the controller may help ensure that network packet 146 is not confused with network packet 142 by the underlying physical or hypervisor switches. However, if desired, a controller may help ensure differentiation between network packets en route to or from an end host and network packets en route to or from a service device by tagging the network packets. FIGS. 13 and 14 are illustrative diagrams showing how network packet 162 may be tagged for identification by underlying switches.

As shown in FIG. 13, tag 165 may be inserted into the header fields of network packet 162 to produce tagged network packet 164. Tag 165 may be formed of any desired number of bits and may be inserted into unused portions of the header fields of network packet 162. For example, tag 165 may be stored in unused portions of a VLAN header field, an IP header field, a VLAN header field, or any desired packet header field.

As shown in FIG. 14, network packet 162 may be encapsulated to form encapsulated packet 166. For example, network packet 162 may be encapsulated using tunneling protocols such as Multi-Protocol Label Switching (MPLS), Virtual Extensible LAN (VxLAN), Provider Backbone Bridges (sometimes referred to as mac-in-mac), Generic Routing Encapsulation (GRE), or any desired protocol for encapsulating network packets. Encapsulating the network packet may include appending tag 167 to network packet 162 (e.g., in a new, additional header field).

Virtual switches such as virtual switch VSW3 do not perform network routing functions. A controller may implement service insertion by configuring one or more virtual switches to tag network packets. FIG. 15 is an illustrative diagram showing how a controller may configure virtual switch VSW3 to redirect network traffic between end host EH5 and end host EH2 through service device 105 (e.g., using L2 forwarding without any L3 routing or virtual routers).

As shown in FIG. 15, end host EH5 may send network packet 172 that is destined for end host EH2. Network packet 172 may include the IP address of end host EH2 (IP2) as a destination IP address, the IP address of end host EH5 (IP5) as a source IP address, the MAC address of end host EH2 (MAC2) as a destination MAC address, and the MAC address of end host EH5 (MAC5) as a source MAC address. If desired, additional header fields such as a VLAN identifier field may be included in packet 172.

Controller 18 may configure virtual switch VSW3 to identify network packet 172 (e.g., based on the destination MAC address, source MAC address, VLAN identifier, etc.), add tag 174 to the identified network packet, and forward tagged network packet 173 to service device 105. Network packet 172 may be tagged as shown in FIG. 13 or FIG. 14. Service device 105 may service tagged network packet 173 and send the serviced packet to virtual switch VSW3. Controller 18 may configure virtual switch VSW3 to identify serviced network packet 173 from tag 174, restore original packet 172 by removing tag 174, and forward packet 172 to end host EH2. By removing tag 174, virtual switch VSW3 may help minimize disruptions due to service device insertion (e.g., end hosts EH2 and EH5 are not aware that network packet 172 was redirected through service device 105).

Figure 16:
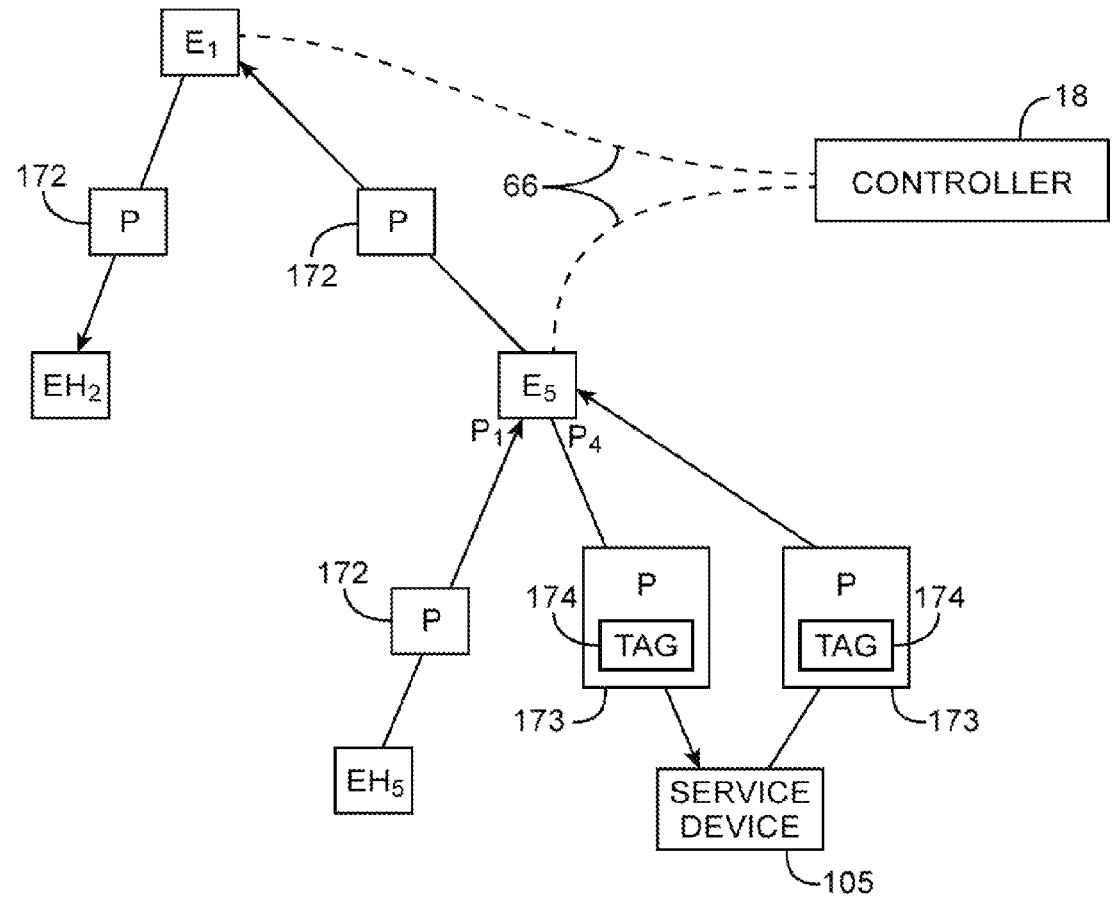
FIG. 16 is a diagram showing how underlying switches of the virtual network topology of FIG. 15 may be controlled in configuring the virtual switch to perform service insertion in accordance with an embodiment of the present invention.

Similarly to Ethernet address rewriting performed during network routing operations by virtual router VR1 in the scenario of FIG. 10, packet tagging by virtual switch VSW3 of FIG. 15 may help ensure that underlying physical and hypervisor switches can differentiate between a packet that is en route to end hosts and the packet when en route to a service device. FIG. 16 is an illustrative diagram showing how controller 18 may configure virtual switch VSW3 to perform service insertion between end hosts EH5 and EH2 by controlling underlying switches.

As shown in FIG. 16, end host EH5 may send packet 172 to hypervisor switch E5. End host EH5 is assigned to virtual switch VSW3 and controller 18 may have configured switch E5 to identify packet 172 (e.g., based on network attributes of packet 172 such as incoming switch port, destination MAC address, or source MAC address), generate tagged packet 174 by tagging packet 172, and send tagged packet 174 to service device 105. For example, controller 18 may provide hypervisor switch E5 with a flow table entry that matches all packets received at logical port P1 of hypervisor switch E5 and directs switch E5 to tag the matching network packets and redirect the tagged network packets to service device 105 via logical port P4 of switch E5. Service device 105 subsequently receives tagged network packet 173, services the network packet, and sends serviced network packet 173 to switch E5 (e.g., via port P4). Controller 18 may have configured switch E5 to differentiate between packet 173 and packet 172 using tag 174. For example, controller 18 may provide a flow table entry that matches network packets having tag 174 and directs switch E5 to untag (e.g., de-tag) the tagged network packets and forward the untagged network packets based on the header fields of the network packet (e.g., based on additional flow table entries that match a destination MAC address of the de-tagged network packet). In other words, controller 18 may configure switch E5 to recover original network packet 172 after service insertion by stripping the tags from the tagged network packets and to forward packet 172 to end host EH2 (e.g., through switch E1 as shown in FIG. 16 or through any desired network path such as through switch E2).

Figure 17:
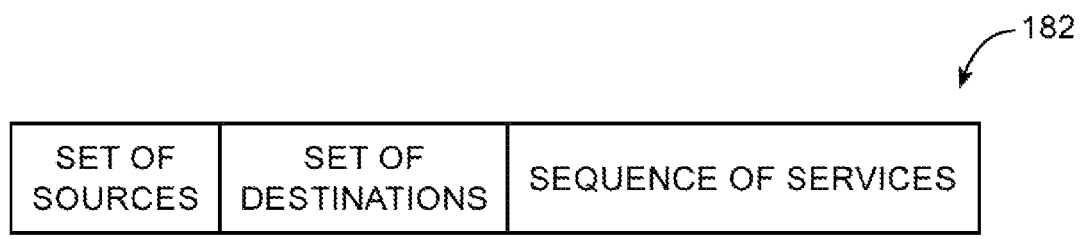
FIG. 17 is a diagram of an illustrative service insertion policy that may be received by a controller in accordance with an embodiment of the present invention.

A controller may implement service insertion based on policies such as received from a network administrator or other user. FIG. 17 is an illustrative diagram of a service insertion policy 182 that may be implemented by a controller such as controller 18 of FIG. 6. As shown in FIG. 17, service insertion policy 182 may include a set of sources, a set of destinations, and a sequence of services to be performed on all network traffic sent from the set of sources to the set of destinations.

The sets of sources and destinations may each be identified using any desired set of network attributes and, if desired, using full or partial wildcarding. A set of end hosts may be identified based on attachment point, Ethernet address, IP address, VLAN identifier, virtual switch assignment, virtual router assignment, or any desired set of one or more network attributes. For example, end host EH1 may be identified as being attached to port P1 of switch E1, port P1 of switch E2, by MAC address, by IP address, as being assigned to virtual switch VSW1, as being coupled to interface IF1 of virtual router VR1, etc. As another example, the set of end hosts EH2, EH4, and EH5 may be identified as being assigned to virtual switch VSW3 or coupled to interface IF1 of virtual router VR2.

A sequence of services may be identified based on desired functions to be performed on network packets between the set of sources and the set of destinations. The services may be listed in order of required insertion. For example, a sequence may be "firewall" and "intrusion detection." In this scenario, network packets from the set of sources should be redirected first to a service device performing firewall functions and second to a service device performing intrusion detection before the network packets are forwarded to a destination end host. If desired, a specific sequence of service devices may be identified by policy 182.

Figure 18:
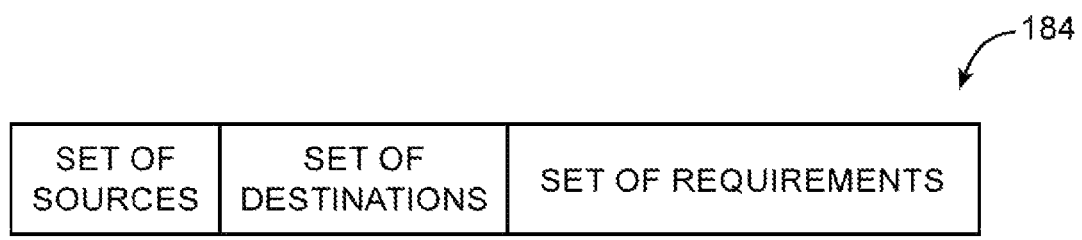
FIG. 18 is a diagram of an illustrative service insertion policy identifying a set of service requirements in accordance with an embodiment of the present invention.

If desired, a sequence of services may be identified from a set of requirements as shown in FIG. 18. Service insertion policy 184 may be defined with a set of requirements that identify required services and other requirements such as constraints or priorities in inserting the required services. As an example, policy 184 may require that the shortest path through the services from the sources to the destinations be implemented by the controller (e.g., the shortest path through an underlying network of physical and hypervisor switches). As another example, policy 184 may include constraints relating to the current processing load for any given service (e.g., to help balance processing load between multiple service devices that perform that service). As yet another example, policy 184 may include constraints relating to the performance capabilities of any given service to help ensure that the service is performed with a minimum level of performance or by service devices having specific features.

Figure 19:
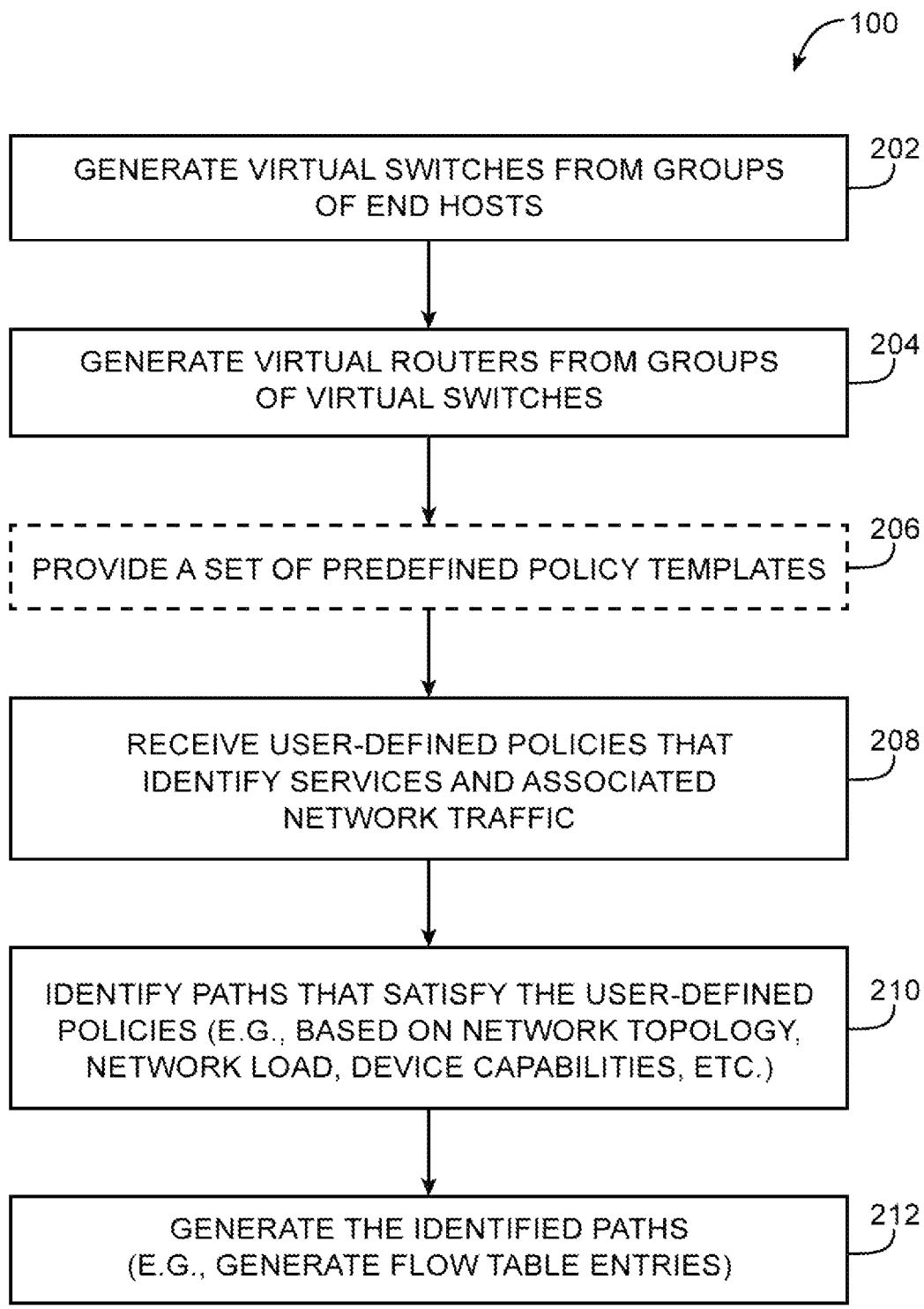
FIG. 19 is a flow chart of illustrative steps that may be performed by a controller in generating a virtual network topology and controlling the virtual network to implement service insertion in accordance with an embodiment of the present invention.

FIG. 19 is a flow chart 200 of illustrative steps that may be performed by a controller such as controller 18 of FIG. 6 to implement service insertion based on service insertion policies.

During step 202, the controller may generate virtual switches from groups of end hosts. The virtual switches may be defined by a user such as network administrator. For example, the controller may receive information identifying groups of end hosts that should be assigned to respective virtual switches.

During step 204, the controller may generate virtual routers from groups of virtual switches. In other words, the controller may generate virtual routers from sets of groups of end hosts. The controller may generate the virtual routers based on information received from a user (e.g., similar to virtual switches). The controller may subsequently perform the operations of step 208 or, optionally, the steps of optional step 206.

During optional step 206, the controller may provide a set of predefined service insertion policy templates. For example, the controller may maintain a database mapping predetermined network topologies with commonly used or preferred service insertion policies for those network arrangements. Network topologies maintained in the database may include virtual network topologies or underlying network topologies. In this optional scenario, the user may select from the provided set of service insertion policies during subsequent step 208.

During step 208, the controller may receive service insertion policies that identify services and associated network traffic. The service insertion policies may be received from a user such as a network administrator. Network traffic may be identified by network sources and network destinations. The services may be identified as an ordered list (e.g., as shown in FIG. 17) or may be identified by a set of one or more requirements (e.g., as shown in FIG. 18).

During step 210, the controller may identify paths that satisfy the user-defined policies. The controller may maintain information identifying the network topology which may be used to identify the paths. For example, the controller may communicate with physical and hypervisor switches in determining the network topology that underlies the virtual network topology. The controller may identify the paths based on information maintained at the controller such as network load and device capabilities to improve performance, to satisfy policy-defined requirements, or to satisfy any desired criteria. The controller may identify the paths to perform layer 3 service insertion using one or more virtual routers as shown in FIG. 10 or may identify the paths to perform layer 2 service insertion using only virtual switches as shown in FIG. 15. In identifying the paths, the controller may first identify virtual paths in a virtual network topology maintained by the controller (e.g., paths through virtual routers and/or virtual switches as shown in FIG. 10 and FIG. 15). The controller may subsequently identify paths in the underlying network topology based on the virtual paths (e.g., paths through physical switches and hypervisor switches as shown in FIG. 11 and FIG. 16).

During step 212, the controller may generate the paths identified during step 210. The controller may communicate with physical and hypervisor switches in generating the identified paths. For example, the controller may provide flow table entries that direct the physical and hypervisor switches to forward and modify network packets matching the flow table entries along the desired network paths.

The foregoing is merely illustrative of the principles of this invention and various modifications can be made by those skilled in the art without departing from the scope and spirit of the invention.

What is claimed is:

1. A method of using a controller that controls switches in a network having end hosts that are coupled to the switches, the method comprising:
    with the controller, forming a plurality of virtual switches from respective groups of the end hosts, wherein at least one virtual switch of the plurality of virtual switches includes ports from at least two switches;
    with the controller, forming a virtual router from a group of the virtual switches in the plurality of virtual switches, wherein the virtual router performs network routing operations, and wherein the network includes service devices that are coupled to the switches;
    with the controller, receiving a service insertion policy that identifies at least one source end host, at least one destination end host, and at least one service to be performed on network packets between the source end host and the destination end host;
    with the controller, selecting a service device that performs the service; and
    with the controller, redirecting network packets between the source end host and the destination end host through the selected service device by controlling the virtual router to forward the network packets between first and second virtual switches of the plurality of virtual switches without encapsulating the network packets.

2. The method defined in claim 1 wherein the switches comprise at least one physical switch.

3. The method defined in claim 2 wherein the switches further comprise at least one hypervisor switch.

4. The method defined in claim 1 wherein the network packets have Ethernet address fields and wherein redirecting the network packets from the source end host to the destination end host by controlling the virtual router comprises:
    controlling the switches to send modified network packets to the selected service device by rewriting the Ethernet address fields of the network packets; and
    controlling the switches to restore the Ethernet address fields of the modified network packets in response to receiving the modified network packets from the service device.

5. The method defined in claim 1 wherein at least two service devices are selected by the controller and wherein redirecting the network packets between the source end host and the destination end host by controlling the virtual router comprises:
    controlling the virtual router to redirect the network packets through the at least two service devices.

6. The method defined in claim 1 wherein selecting the service device that performs the service comprises selecting a service device from the group consisting of: a firewall, a load balancer, an intrusion detection device, a packet monitoring device, and an encryption device.

7. The method defined in claim 1 wherein redirecting the network packets between the source end host and the destination end host through the selected service device by controlling the virtual router comprises:
    providing flow table entries to the switches that match the network packets between the source end host and the destination end host, wherein the flow table entries direct the switches to redirect the network packets through the selected service device.

8. The method defined in claim 1 further comprising:
    redirecting network packets between the source end host and the destination end host through the selected service device by controlling the first and second virtual switches.

9. The method defined in claim 8 wherein redirecting the network packets between the source end host and the destination end host by controlling the first and second virtual switches comprises:
    controlling the switches to tag the network packets and send the tagged network packets to the selected service device; and controlling the switches to untag the tagged network packets in response to receiving the tagged network packets from the selected service device.

10. A method of using a controller that controls switches in a network having end hosts and service devices that are coupled to the switches, the method comprising:
   receiving a service insertion policy that identifies network traffic and at least one service to be performed on the network traffic;
   identifying at least one service device based on the service insertion policy;
   controlling the switches to redirect the network traffic through the identified service device; and
   with the controller, generating a virtual topology including a plurality of virtual switches and virtual routers, wherein each virtual switch and each virtual router is distributed across multiple underlying switches, wherein the virtual switches have virtual ports that are coupled to the end hosts, and wherein the virtual routers have virtual interfaces that are coupled to the virtual switches, wherein controlling the switches to redirect the network traffic through the identified service device comprises:
      controlling a given virtual switch of the plurality of virtual switches to convey the identified network traffic to a given virtual router of the plurality of virtual routers without encapsulating the network traffic.

11. The method defined in claim 10 wherein each virtual interface of the virtual routers is assigned a respective Ethernet address and is associated with a respective IP domain, wherein the identified service device is coupled to a first virtual interface of the given virtual router and is associated with a first IP domain, wherein a source end host of the identified network traffic is coupled to a second virtual interface of the given virtual router and is associated with a second IP domain, wherein the identified service device has a given Ethernet address, and wherein controlling the switches to redirect the network traffic through the identified service device comprises:
   controlling the switches to send modified network packets to the identified service device by rewriting source Ethernet address fields of the network traffic with the Ethernet address of the first virtual interface of the given virtual router and rewriting destination Ethernet address fields of the network traffic with the given Ethernet address of the identified service device.

12. A method of using a controller that controls switches in a network having end hosts and service devices that are coupled to the switches, wherein the switches forward network packets between the end hosts, the method comprising:
   selecting at least one service device;
   identifying the network packets that are to be serviced by the selected service device; and
   controlling the switches to redirect the identified network packets through the selected service device without encapsulating the identified network packets, wherein controlling the switches to redirect the identified network packets through the selected service device comprises:
      providing flow table entries to the switches that match the identified network packets and direct the switches to send modified network packets to the selected service device.

13. The method defined in claim 12 wherein controlling the switches to redirect the identified network packets through the selected service device further comprises:
   providing flow table entries to the switches that match the modified network packets and direct the switches to restore the identified network packets from the modified network packets in response to receiving the modified network packets from the selected service device.

14. The method defined in claim 12 further comprising:
   receiving a set of service requirements; and
   based on the service requirements of the set, selecting the at least one service device to satisfy the service requirements.

15. The method defined in claim 12, further comprising:
   with the controller, generating a virtual topology including a plurality of virtual switches and virtual routers, wherein each virtual switch and each virtual router is distributed across multiple underlying switches, wherein the flow table entries direct the switches to send the modified network packets to the selected service device through at least one of the plurality of virtual routers and through a physical network device having an Open Systems Interconnection (OSI) Layer 3 forwarding module that performs matching operations on Layer 3 header fields of the modified network packets.

* * * * *